J. DONOVAN.
Casting Steel-Faced Anvils.

No. 160,816.  Patented March 16, 1875.

WITNESSES:
E. Neveux
A. F. Terry

INVENTOR:
J. Donovan
BY Munn & Co.
ATTORNEYS.

THE GRAPHIC CO.PHOTO-LITH.39 & 41 PARK PLACE,N.Y.

UNITED STATES PATENT OFFICE.

JOHN DONOVAN, OF CARPENTERSVILLE, ILLINOIS.

IMPROVEMENT IN CASTING STEEL-FACED ANVILS.

Specification forming part of Letters Patent No. 160,816, dated March 16, 1875; application filed December 12, 1874.

*To all whom it may concern:*

Be it known that I, JOHN DONOVAN, of Carpentersville, in the county of Kane and State of Illinois, have invented a new and useful Improvement in Making Steel-Faced Cast-Iron Anvils, of which the following is a specification:

The invention will first be fully described, and then pointed out in the claims.

Figure 2:
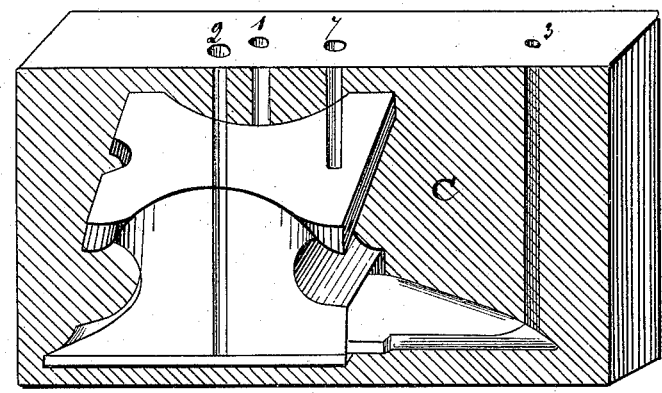
Figure 1:
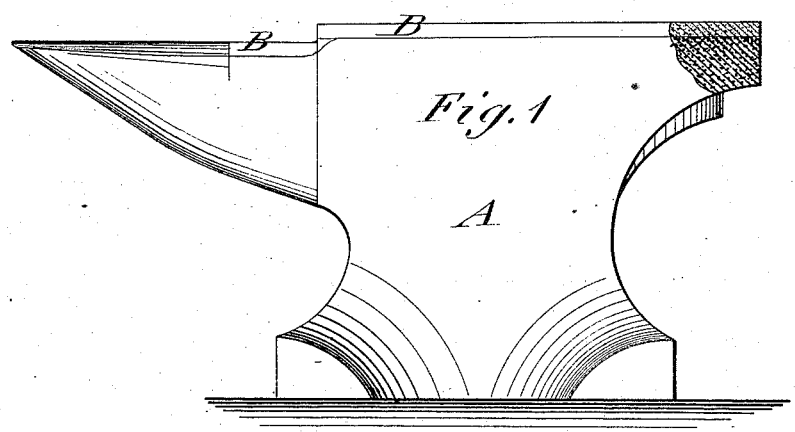
Figure 5:
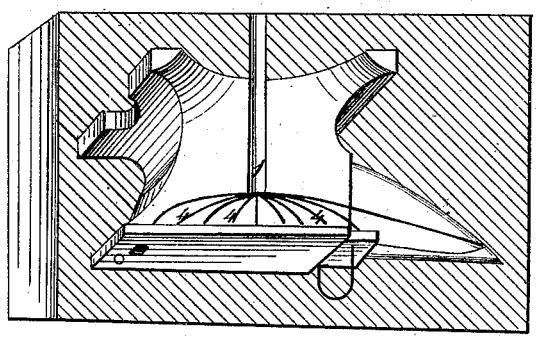
Figure 3:
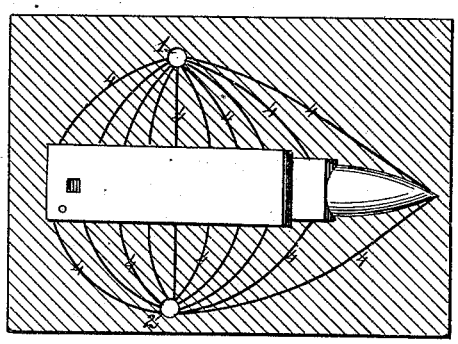
Figure 4:
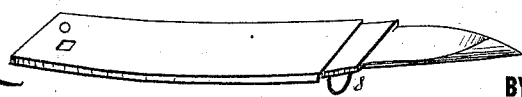

Figure 1 is a side elevation of an anvil constructed according to my invention, with a part shown in section. Fig. 2 is a longitudinal sectional elevation of the mold. Fig. 3 is a horizontal section. Fig. 4 is a perspective view of the steel face. Fig. 5 is a section of the mold in perspective.

Similar letters of reference indicate corresponding parts.

A is the cast-iron body, and B the steel face, which I propose to make by casting the iron on and welding it to the face. C represents the mold in which the iron is cast on the steel face. 1 and 2 represent the sprues for pouring in the iron; 3, a riser for running over the mold to heat the steel up to a welding heat by the molten iron. It is arranged at the end of the horn to insure the heating of it. 4 represents the gates which connect the sprues with the mold. They are arranged on both sides and distributed along the mold from end to end to insure the heating of the face-plate alike at all points, so that it will not warp. 7 represents a shrink-sprue. 8 is a wire loop attached to the under side of the horn, and extending down in the sand of the mold for holding the horn in place. I make the face-plate a little concave lengthwise, as shown in Fig. 4, to compensate for the greater shrinkage of the middle portion of the cast-iron, and thus make it come straight when the anvil cools.

I heat the steel to a very low red heat and sprinkle on the flux, which I skim off as soon as it melts. The steel is then ready for the mold, in which I place it while hot if it is more than a half inch in thickness, but if less I put it in cold and heat it by the cast-iron, letting it overflow until the steel is heated. If the iron is sharp it does not require to overflow but little. If I wish to make a perfect weld I remove the scale from the steel before putting on the flux. By calcining the flux on the hot iron before putting it in the mold, and then removing it, the weld is without porosity, more perfect than when it is put on in the mold and left on.

Having thus described my invention, I claim as new and desire to secure by Letters Patent—

1. The wire loop in the horn of the plate, for keeping it in place in the mold, substantially as specified.

2. Constructing the face-plate concave on the side receiving the iron, to compensate for the greater shrinkage of the iron in the middle, substantially as specified.

JOHN DONOVAN.

Witnesses:
GEORGE WARDLOW,
CHARLES WILBUR.